Inventor
Edward James Wright

Feb. 7, 1967   E. J. WRIGHT   3,302,676
ROTARY CHIPPING MACHINE
Filed April 6, 1964                                3 Sheets-Sheet 3
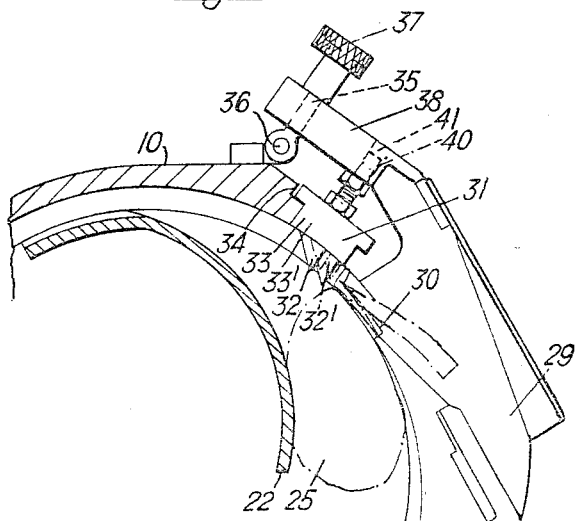
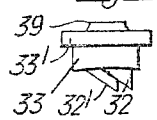 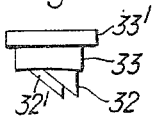
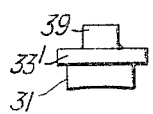
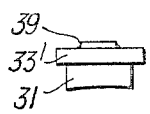
Inventor
Edward James Wright
By
Stevens, Davis, Miller & Mosher, Attorneys 3,302,676
ROTARY CHIPPING MACHINE
Edward James Wright, Kings Norton, Birmingham, England, assignor to Peerless & Ericsson Limited, Birmingham, England, a British company
Filed Apr. 6, 1964, Ser. No. 357,533
Claims priority, application Great Britain, May 24, 1963, 20,936/63
6 Claims. (Cl. 146—78)

The present invention relates to a rotary chipping machine for cutting potatoes into potato chips, or slicing other vegetables.

In one conventional form of rotary chipping machine a gravity feed for peeled potatoes leads from a hopper to the centre of the interior of a rotating rotor. The rotor itself is provided with two diametrically opposed involute shaped boots opening towards the centre of the rotor and adapted to collect potatoes from the centre. The rotation of the rotor in combination with the involute shape of the boots causes the potato, so collected to be held in contact with the inner wall of an outer shell, the involute boots being V-shaped in section thus preventing movement of the potato in the direction of the axis of the rotor. Through said outer shell project a set of staggered slitting knives and a slicer knife.

The potato is thus caused to move relative to the slitting knives which are arranged in the radial plane relative to the rotor and then past the slicer knife which is arranged in a tangential plane relative to the rotor. In these conventional machines, if it is desired to cut a potato chip of a different size, then it is necessary to replace both the slitting knives and slicer knife by ones having different dimensions. It is an object of the present invention to provide an improved rotary chipping machine.

According to the present invention, there is provided a rotary chipping machine comprising a hollow casing having therein a rotor adapted, when potatoes are fed to the casing, to urge potatoes round the inner wall of the casing, and a slicer knife arranged in the path of potatoes urged round the casing by the rotor, the slicer knife being adjustably mounted relative to the casing so that the position of the cutting edge of the slicer knife relative to the said paths may be varied whereby slices of different thickness may be cut.

Conveniently, the slicer knife is pivotally mounted on the casing and is preferably mounted in a slicer knife holder which is pivoted at one end to the casing and is adjustably securable at the other end to the casing whereby the slicer knife can be moved so that the spacing of the cutting edge of the knife inwardly from the inner surface of the casing may be adjusted.

The chipping machine may also include a plurality of slitter knives arranged in the said path of the potatoes so as to slit potatoes in the plane normal to the slicer knife.

Advantageously the slitter knives are embedded in an easily removable block, the chipper being provided with a number of interchangeable blocks, each having the knives spaced at a different distance so that, by replacing the block, chips of different width may be cut. Desirably the block is made of plastics material and this may be mounted in the slicer knife holder.

In one particularly advantageous form of the invention, the removable slitting knife block carries means cooperating with the adjustable slicer knife or slicer knife holder so that the block itself determines the position of the slicer knife. Thus the shape of each individual block may be chosen so that for a given spacing of the slitting knife blades the slicer knife is so positioned to give the desired thickness of the chip for that width of chip cut by the slitting knife blades. In practice it is desirable that the shape of the block be such that the slitting and slicing knives produce a chip of substantially square cross-section. In a convenient form, the said block may be provided with a pad on the reverse side of the block from the knives which pad is adapted to be positioned in the pivotable slicer knife holder so that the block bears on the casing and forms an abutment, which determines the rotational position of the slicer knife holder relative to the casing.

If desired, blocks without slitting knives may be used so that the chipper merely slices the potatoes, or any other vegetable fed to the interior of the rotor. By a suitable choice of block the thickness of the slice produced can be varied as desired.

Where the slicer knife holder is pivotally mounted on the casing, for example by means of a pivot shaft, the pivot shaft may be locked to the holder, so as to rotate therewith, and be arranged to operate a rotary on-off switch, thus providing a safety device preventing the machine being turned on when the knives are not in the operating position.

In order that the invention may more readily be understood the following description is given of one preferred embodiment of rotary chipping machine as shown in the accompanying drawings, in which:

FIGURE 3 is a fragmentary view similar to FIGURE 1 showing a potato in position and being chipped;

FIGURE 4 is a side elevation of a slitting knife block without a pad;

FIGURE 5 is a similar view to FIGURE 4 of a block with a pad, and

FIGURES 6 and 7 are side elevations of blocks without slitting knives having pads of different sizes.

Figure 1:
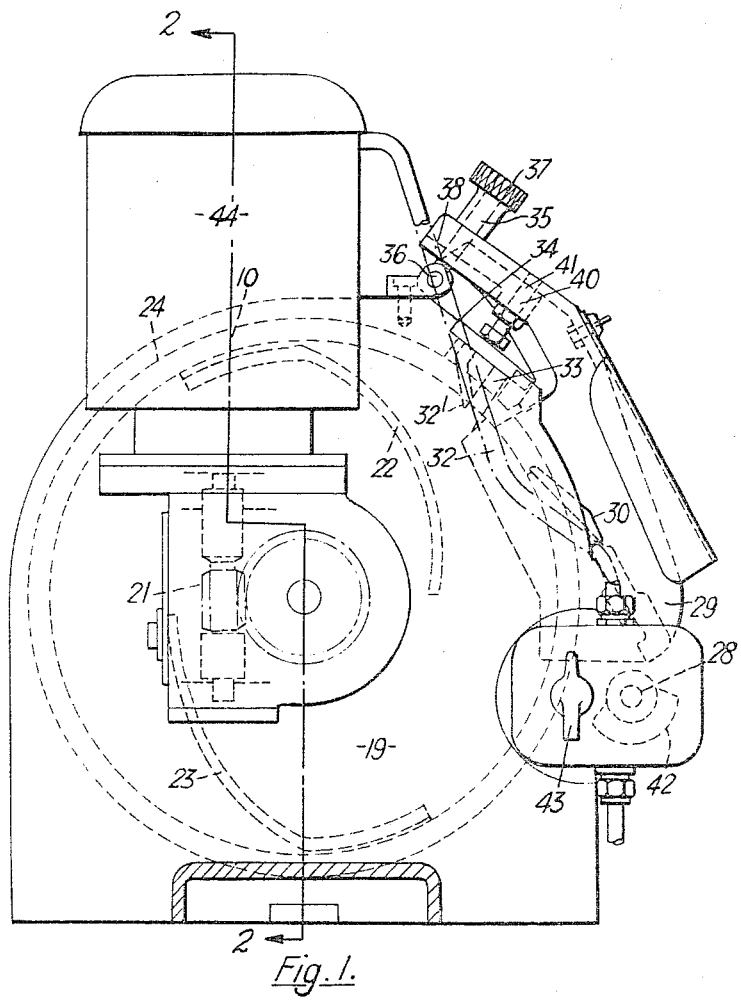
FIGURE 1 is a vertical section through the machine on the line 1—1 of FIGURE 2.
Figure 2:
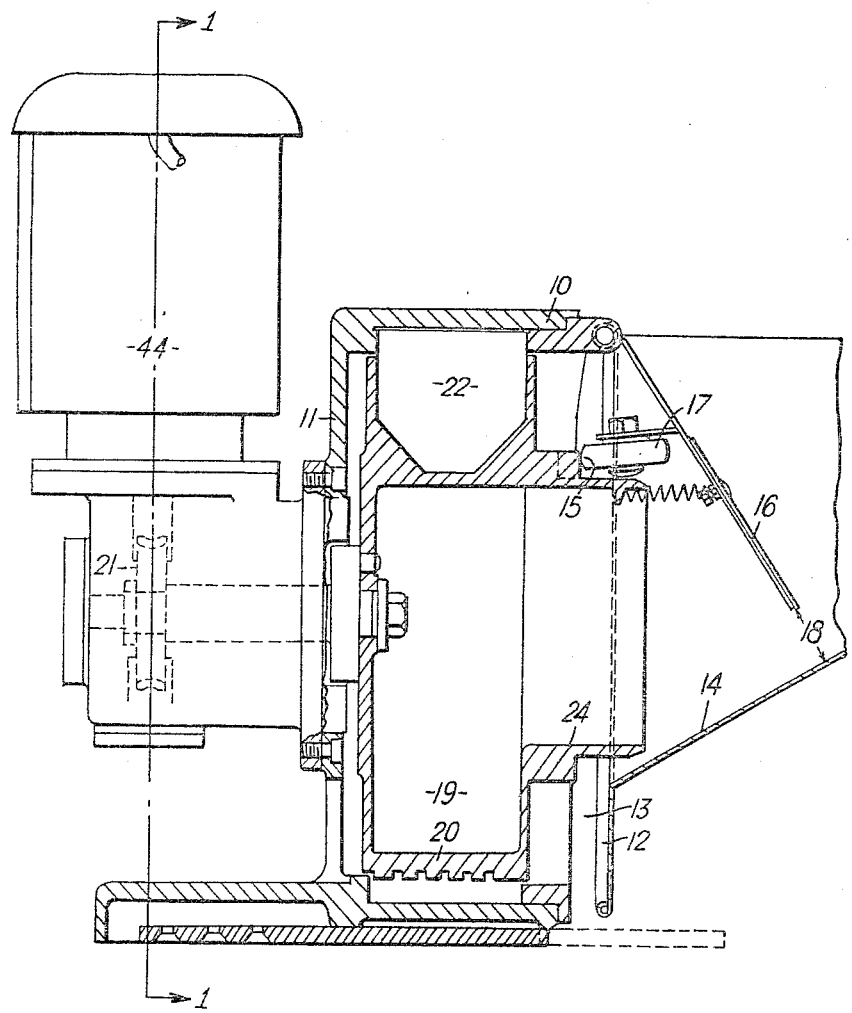
FIGURE 2 is a vertical section on the line 2—2 of FIGURE 1.

Referring to the drawings, a potato chipping machine comprises a hollow generally annular casing 10 having end plates 11, 12 defining a central chamber 13. One of the end plates 12 has bolted thereto a triangular feed hopper 14 this being provided with a cam operated agitator plate 16 actuated through a roller 17 resting on a face cam 15. An adjustable opening 18 in the agitator plate gives graduated control of potatoes in the hollow center 19 of a rotor mounted within the casing 10. The rotor 20 which is driven through a worm drive 21 from a motor 44 secured to the other end plate 11 has two diametrically opposed involute shaped boots, 22, 23 opening into the center, the involute boots being V-shaped in section. A raised helix (not shown) on the inner wall 24 of the casing 10 directs potatoes 25 from an opening in the first mentioned end plate to the center 19 of the rotor 20.

The annular wall 10 of the casing is formed with a generally rectangular opening 26 near the top. A bearing 27 is secured to the casing 10 near the lower end of the opening 26 such bearing carrying a pivot shaft 28 to which is secured a slicer knife holder 29, formed as two castings which clamp between them a slicer knife blade 30, so that the latter is substantially tangential to the rotor 20 when the slicer knife holder 29 is pivoted to close the opening 26 in the casing 10.

The slicer knife holder 29 is also arranged to receive a slitting knife block 31 formed of a plastic material and carrying two rows of slitting knife blades 32, 32' which are spaced apart and in staggered relation. The block 31 includes a body portion 33 and a flange 33' on the side thereof remote from the knives 32, 32', the body portion 33 and flange 33' being arranged, when the block 31 is secured in the slicer knife holder 29, to abut against the upper end of the opening 26 and a rebate 34 therein respectively. Thus the flange 33' on the slitting knife block 31 forms an abutment which determines the rotational position of the slicer knife holder 29 in the closed position. A bolt 35 pivoted at 36 to the top of the casing 10 and provided with a locking nut 37 is used to pass between bifurcations 38 in the top of the slicer knife holder 29 so that the locking nut 37 can be screwed down to hold the slicer knife holder 29 in the closed position.

The machine may be provided with a number of different sized slitting knife blocks in which the slitting knife blades are spaced at different intervals, a pad 39 being fixed on the side of the flange 33' remote from the slitting knife blades 32, 32'. A pin 40 engages in a corresponding hole 41 in the slicer knife holder 29. The abutment of the head at the lower end of pin 40 with the pad 39, where provided, or the upper surface of the block 31, determines the rotational position of the slicer knife holder 29. The blocks of different size are provided with pads of different depths as will be described later.

The pivot shaft 28 which rotates with the slicer knife holder 29 is provided with a cam 42 which operates an on-off switch 43 in such a way that unless the slicer knife holder 29 is in the closed position the motor 44 cannot be switched on. The face cam 15 for operating the agitator plate 16 is provided on the face of the rotor 20 so that, as the latter rotates, the agitator plate 16 is caused to vibrate.

In operation of the machine as a potato chipper, the size of chip to be cut is chosen and a suitable slitting knife block selected. For example, if a ⅝₁₆" sq. chip is desired, then the appropriate block is provided with blades suitably spaced and a small pad on the side thereof remote from the blades while if a chip ½ inch sq. is desired the appropriate block has no pad mounted thereon. Thus if the ⅝₁₆ inch block is mounted in the slicer knife holder 29 by means of its pin 40 and the holder pivoted to its closed position and locked by means of the locking nut 37, the slicer knife blade edge is spaced further from the centre of the casing than if the ½ inch block is substituted.

Having selected the appropriate block, secured it to the holder and locked the latter in the closed position, potatoes are placed in the hopper and the motor turned on. Vibration of the agitator plate 16 feeds potatoes to the raised helix on the casing and thence to the centre of the rotor where they are thrown outwardly and a potato 25 is held in contact with the inner wall of the casing by each involute boot 22 the V-shape of the latter preventing the associated potato from moving axially of the rotor.

Each potato is thus caused to pass through the slitting knife blades immediately whereafter the potato engages the slicer knife and is thus cut into a square chip, the chips passing out through a discharge chute in the slicer knife holder.

If desired the slitting knives may be omitted and various sized blocks provided so that sliced potatoes or other vegetables may be produced using the machine. Such blocks are illustrated in FIGURES 6 and 7, the different sized pads determining the thickness of the slice to be cut.

I claim:
1. A rotary chipping machine comprising a hollow casing defining an inner surface, a path on said surface, a rotor rotatable inside the casing and effective to urge potatoes along said path, a slicer knife holder mounted on the casing and having two ends, a pivot shaft attaching one of said ends to the casing, a slicer knife mounted on the slicer knife holder in a position to cut potatoes urged along said path, clamping means attaching the other of said ends to the casing and effective to urge the other of said ends towards the casing, a block removably mountable on the casing and an abutment on said block for the slicer knife holder, whereby the block determines the position of the slicer knife relative to said surface so that slices of a given thickness may be cut.

2. A machine according to claim 1, wherein the block is removably affixed to the slicer knife holder.

3. A machine according to claim 1, wherein a plurality of slitter knives are mounted on the block.

4. A rotary chipping machine comprising a hollow casing defining an inner surface, a path on said surface, a rotor rotatable inside the casing and effective to urge potatoes along said path, a slicer knife holder mounted on the casing and having two ends, a pivot shaft attaching one of said ends to the casing, a slicer knife mounted on the slicer knife holder in a position to cut potatoes urged along said path, clamping means attaching the other of said ends to the casing and effective to urge the other of said ends towards the casing and a block removably mountable in the slicer knife holder and an abutment on said casing for the block, whereby the block determines the position of the slicer knife relative to said surface and slices of a given thickness may be cut.

5. A machine according to claim 4, wherein a pad is affixed to the block, and an abutment is formed on said slicer knife holder and is positioned to abut said pad, the thickness of the pad being effective to determine the position of the slicer knife holder.

6. A machine according to claim 5, wherein a plurality of slitter knives are mounted on the block.

References Cited by the Examiner

UNITED STATES PATENTS

| | | | |
|---|---|---|---|
| 1,709,912 | 4/1929 | Johnston | 146—78 X |
| 2,545,720 | 3/1951 | Abbott | 146—78 |
| 2,923,337 | 2/1960 | Jouin | 146—78 |
| 3,139,129 | 6/1964 | Urschel et al. | 146—78 X |

WILLIAM W. DYER, Jr., *Primary Examiner.*

W. GRAYDON ABERCROMBIE, *Examiner.*